US012068791B2

(12) United States Patent
Marrapode et al.

(10) Patent No.: US 12,068,791 B2
(45) Date of Patent: Aug. 20, 2024

(54) PHOTONIC CHIP COUPLER CONNECTOR MODULE

(71) Applicant: Molex, LLC, Lisle, IL (US)

(72) Inventors: Thomas R. Marrapode, Naperville, IL (US); Zuon-Min Chuang, Taoyuan (TW); Sung-Ping Huang, Hsinchu (TW); Wenzong Chen, Naperville, IL (US)

(73) Assignee: Molex, LLC, Lisle, IL (US)

( * ) Notice: Subject to any disclaimer, the term of this patent is extended or adjusted under 35 U.S.C. 154(b) by 9 days.

(21) Appl. No.: 17/379,110

(22) Filed: Jul. 19, 2021

(65) Prior Publication Data

US 2022/0029712 A1    Jan. 27, 2022

Related U.S. Application Data

(60) Provisional application No. 63/055,901, filed on Jul. 24, 2020.

(51) Int. Cl.
| | | |
|---|---|---|
| *G02B 6/42* | (2006.01) | |
| *G02B 6/38* | (2006.01) | |
| *H04B 10/80* | (2013.01) | |

(52) U.S. Cl.
CPC ......... *H04B 10/801* (2013.01); *G02B 6/3882* (2013.01); *G02B 6/3885* (2013.01); *G02B 6/4202* (2013.01); *G02B 6/4218* (2013.01); *G02B 6/4238* (2013.01); *G02B 6/4261* (2013.01)

(58) Field of Classification Search
CPC .. G02B 6/3831; G02B 6/3839; G02B 6/3825; G02B 6/4202; G02B 6/4206
See application file for complete search history.

(56) References Cited

U.S. PATENT DOCUMENTS

| | | | | |
|---|---|---|---|---|
| 4,469,941 A | * | 9/1984 | Palmer | G02F 1/09 |
| | | | | 385/116 |
| 6,299,361 B1 | * | 10/2001 | Sasaki | G02B 6/3636 |
| | | | | 385/59 |
| 9,933,574 B1 | * | 4/2018 | Zhang | G02B 6/4239 |
| 10,684,419 B2 | * | 6/2020 | Fortusini | G02B 6/13 |
| 2003/0174953 A1 | * | 9/2003 | Carnevale | G02B 6/4472 |
| | | | | 385/39 |
| 2013/0156365 A1 | | 6/2013 | Barwicz et al. | |
| 2018/0267255 A1 | * | 9/2018 | Butler | G02B 6/3885 |

(Continued)

FOREIGN PATENT DOCUMENTS

WO    WO-2018044646 A1 *  3/2018  ............... G02B 6/30

OTHER PUBLICATIONS

Noriki, A. et al., "Low-Cost MT-Ferrule-Compatible Optical Connector for Co-packaged Optics Using Single-Mode Polymer Waveguide," Conference: 2019 IEEE 69th Electronic Components and Technology Conference (ECTC), May 2019, pp. 2042-2047.

*Primary Examiner* — Eric Wong (57) ABSTRACT

An optical interconnect module for coupling a photonic integrated chip to an optical ferrule is provided. The optical interconnect module may include a coupler for interfacing to the photonic integrated chip, the coupler comprising at least one guide pin. The optical interconnect module may include an optical ferrule configured for being removably attached to the coupler, the optical ferrule comprising at least one through hole for receiving the at least one guide pin from the coupler.

21 Claims, 8 Drawing Sheets

(56) References Cited

U.S. PATENT DOCUMENTS

| | | | |
|---|---|---|---|
| 2019/0146162 A1* | 5/2019 | Evans | G02B 6/4204 |
| | | | 385/89 |
| 2020/0049901 A1* | 2/2020 | Jian | G02B 6/3863 |
| 2021/0271037 A1* | 9/2021 | Brusberg | G02B 6/4274 |
| 2022/0196931 A1* | 6/2022 | Li | G02B 6/4206 |
| 2022/0373742 A1* | 11/2022 | Kim | G02B 6/30 |

* cited by examiner

PHOTONIC CHIP COUPLER CONNECTOR MODULE

RELATED APPLICATIONS

The present application claims priority to U.S. Patent Application No. 63/055,901 filed Jul. 24, 2020 which is incorporated by reference in its entirety.

TECHNICAL FIELD

The present disclosure relates to the field of optical transmission systems, and more particularly but not exclusively, to systems and methods for photonic chip-to-fiber coupling.

BACKGROUND ART

Bandwidth requirements have been ever increasing as greater demands are placed on communication systems including optical fiber systems. Photonic integrated circuits are an integral part of many optical fiber systems that allow high bandwidth to traverse the optical fiber systems. Coupling optical fibers to integrated circuits can be accomplished through various strategies. Existing strategies, however, have limited the ability to address challenges based on greater bandwidth demands and the evolution of the chip package design.

There is therefore a need for improved couplers that address these and other challenges in optical fiber systems. The present disclosure is directed to solving these problems and to provide various improvements in the connector assemblies and the process for putting the assemblies together.

SUMMARY

In an aspect of the disclosure, an optical interconnect module for coupling a photonic integrated chip to an optical ferrule is provided. The optical interconnect module may include a coupler for interfacing to the photonic integrated chip, the coupler including at least one guide pin. The optical interconnect module may include an optical ferrule configured for being removably attached to the coupler, the optical ferrule including at least one through hole for receiving the at least one guide pin from the coupler.

In another aspect of the disclosure, a method for assembling an optical interconnect module for coupling a photonic integrated chip to an optical ferrule is provided. The method may include providing a coupler for a photonic integrated chip, the coupler including at least one guide pin. The method may include attaching an optical ferrule including at least one through hole to the coupler by mating the at least one guide pin to the at least one through hole, the optical ferrule configured to be removably attached to the coupler.

BRIEF DESCRIPTION OF THE DRAWINGS

FIGS. 1A-C are views of one exemplary coupler connector configuration using a 2D-to-1D waveguide structure including a photonic integrated chip (PIC) substrate, a coupler waveguide, and a connector module; with FIG. 1B illustrating a side view of the PIC substrate and coupler waveguide with an attached alignment pin.

FIGS. 3A-D are views of another exemplary coupler connector configuration using a single row fiber array structure including a PIC substrate, a coupler waveguide, and a connector module; with FIG. 3B illustrating a side view of the PIC substrate and coupler waveguide with an attached alignment pin.

FIGS. 4A-D are views of another exemplary coupler connector configuration using an arrayed lens structure including a PIC substrate, a coupler waveguide, and a connector module; with FIG. 4B illustrating a side view of the PIC substrate and coupler waveguide with an attached alignment pin.

DETAILED DESCRIPTION OF THE PREFERRED EMBODIMENTS

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. It will, however, be apparent to those skilled in the art that these concepts may be practiced without these specific details. In some instances, well known structures and components are shown in block diagram form in order to avoid obscuring such concepts.

Several aspects of the connector configuration will now be presented with reference to various apparatuses and methods. These apparatuses and methods will be described in the following detailed description and illustrated in the accompanying drawings by various blocks, modules, components, steps, processes, etc. (collectively referred to as "elements"). While the methods may be described in an ordered series of steps, it will be apparent to those skilled in the art that the methods may be practiced in any operative order and each step may be practiced in various forms that are apparent to those skilled in the art.

Disclosed herein are optical fiber connector module configurations and methods used in edge coupling for fiber-to-photonic chip applications. Optical fiber connector modules are used within optical communication systems and provide an important connection point by aligning and coupling segments of optical fibers (e.g., with the connector modules latched at different ends of a housing) so that signals may be switched and transmitted between the segments. In the various embodiments, the connector modules may be mechanical transfer (MT) connectors. The connector modules may include MT ferrules.

Coupling optical fibers to photonic integrated circuits (PICS) may present challenges due to factors such as chip facet reflections, mode mismatch, conversion losses, etc. between the optical fibers and material of the PICS, with the factors leading to possible transmission losses. The desire for PIC package density and flexibility in deployment requires improved designs for the edge connectors.

FIG. 1 illustrates one exemplary coupler connector configuration 100A using a 2D-to-1D waveguide structure including a PIC or PIC substrate 120, a coupler or coupler waveguide 110, and a connector module 130. The example 100A of FIG. 1 and the other embodiments described below show alternative designs to address the many issues for designing the connector configurations that may include a compact design coupling a large number of optical fibers to a PIC. In FIG. 1, the coupler 110 is shown using a two dimensional-to-one dimensional waveguide structure to couple the optical fibers 160 to the PIC 120. The coupler 110 may include pin holes 114a-b for inserting alignment pins to couple the connector module 130 to the coupler 110. Corresponding pin holes 114c-d on the connector module 130 enable insertion of the pins into the connector module 130. While the pins holes 114c-d are shown spanning the entire length of the connector module 130, in some embodiments the pin holes in the coupler 110 or the connector module 130 may have varying depths to suit design requirements. In others embodiment, the components 110, 130 may include only one align pin or more than two alignment pins based on user design. As shown in FIG. 1A, the alignment pins may be co-planar with the optical fibers 160 which reduces the height or profile of the connector module 130. In other embodiments, the alignment pins may be oriented on a different plane from the optical fibers 160. When the connector module 130 is mated to the coupler 110, the optical fibers 160 couple to the waveguide structures on the coupler 110. In some embodiments, the waveguide may preserve polarization of the signals. In some embodiments (not shown in FIG. 1), additional features aid in the coupling efficiency between the components; for example a latching mechanism ensures a secure attachment while a biasing mechanism such as a spring applies a forward biasing force on the optical fibers in physical contact with the coupler 110.

Figure 1A:
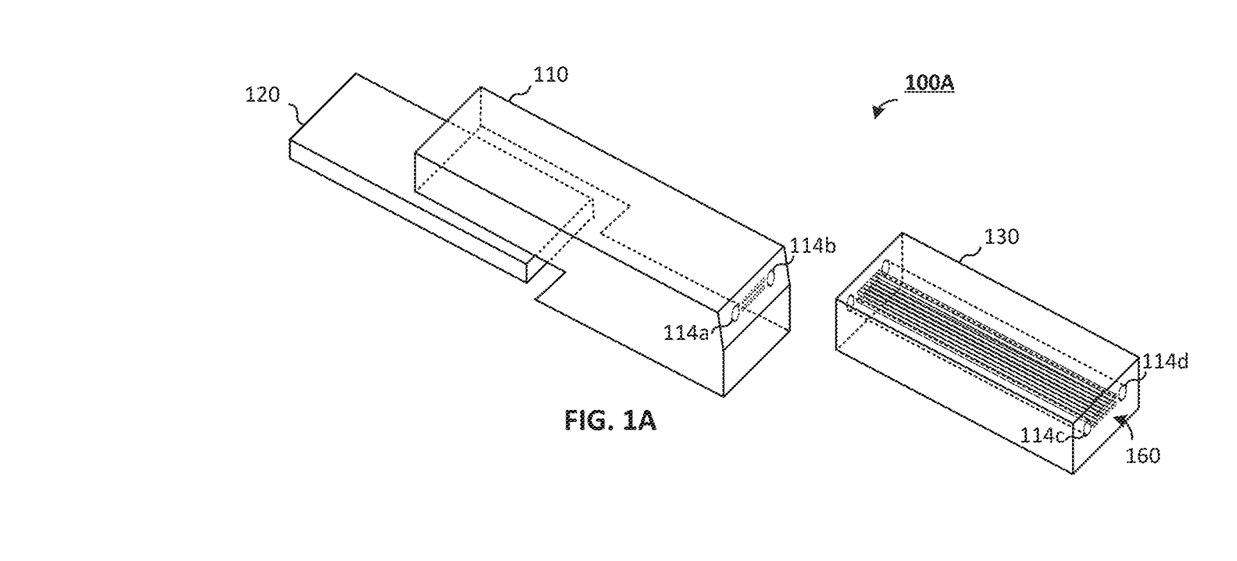

In some embodiments, the coupler 110 may include glass or metallic material. In some embodiments, the coupler 110 may be attached to the PIC substrate 120 using one of a variety of methods, which may include soldering, epoxy, etc. When the components are soldered together, the components such as the coupler 110 may include metallization for the solder or reflow soldering. In some embodiments surface indicators or fiducials (not shown) may be provided to aid in machine vision placement and alignment of the components. In some embodiments, metallized fiber cladding may be soldered to the fibers 160 to provide hermetic sealing of the fibers 160.

Figure 1B:
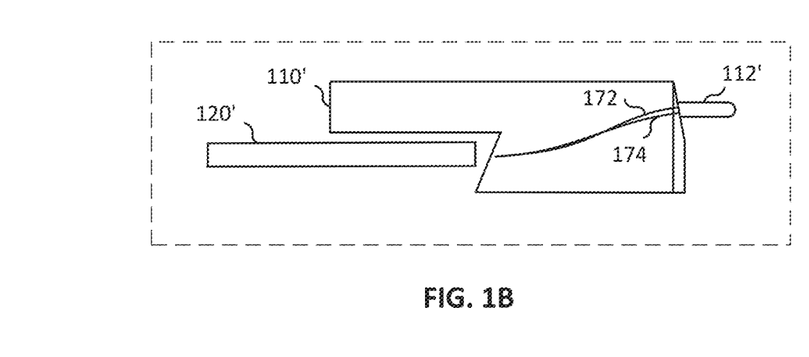

FIG. 1B illustrates a side view of the PIC substrate 120' and coupler waveguide 110' with an attached alignment pin 112'. As shown in FIG. 1B, the waveguide structure shows two waveguide paths 172, 174 to direct the two rows of optical fiber signals (i.e., 2D structure) on to a single row (i.e., 1D structure) for coupling to the PIC 120'. In some embodiments, an index matching material such as an adhesive may be placed between the coupler 110' and PIC substrate 120' or a film may be placed between the coupler 110' and connector module 130'.

Figure 1C:
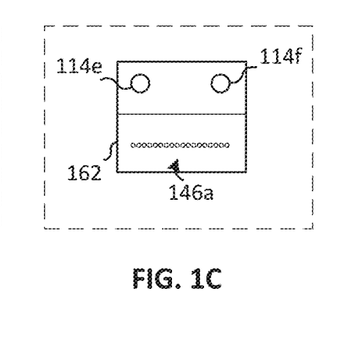
FIG. 1C showing a rear face profile view of the coupler waveguide.
Figure 1D:
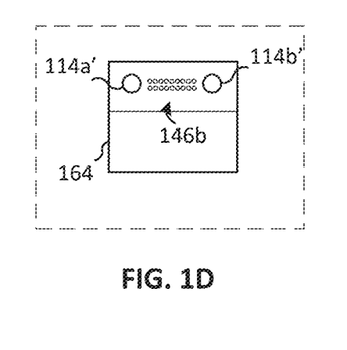
FIG. 1D showing a front face profile view of the coupler waveguide.

FIGS. 1C-D show the front and rear face profiles of the coupler waveguide. FIG. 1C shows the rear face 162 (side that couples to PIC substrate) showing the location of pin holes 114e-f and the location of the waveguides 146a facing the PIC substrate. On this rear face 162, the waveguides have been converted to the single row (1D) array. FIG. 1D shows the front face 164 (side that couples to connector module) showing the location of pin holes 114a'-b' and the location of the waveguides 146b facing the connector module. On this front face 164, the waveguides have a double row (2D) array structure suited for mating to the double row (2D) array of optical fibers terminated in the connector module 130.

Figure 2A:
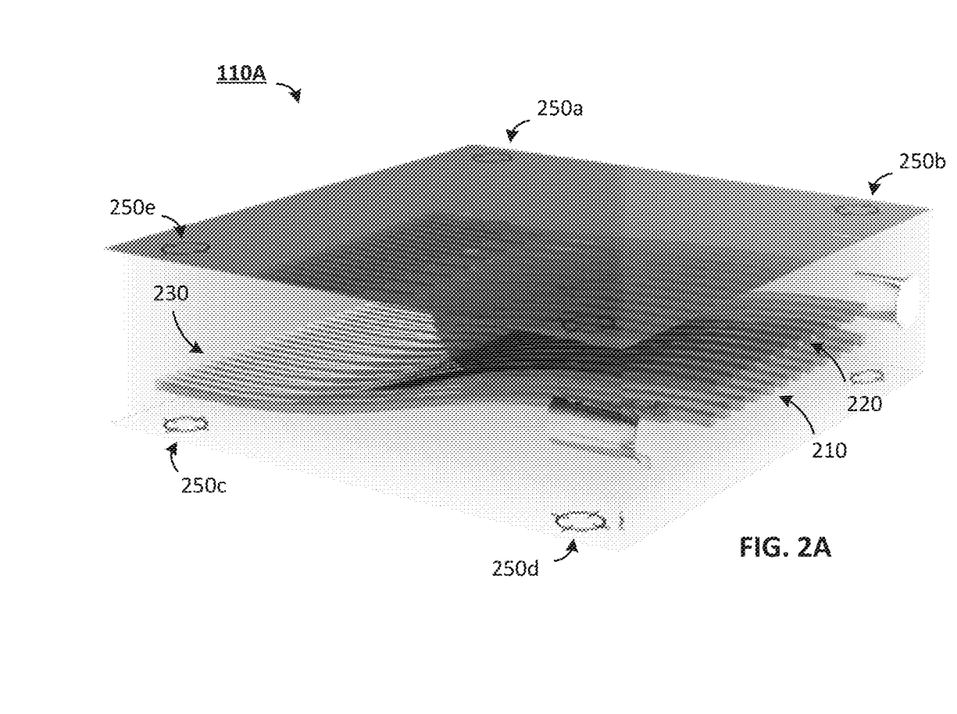
FIGS. 2A-B are views of aspects of the coupler waveguide of FIG. 1A, with FIG. 2A showing an embodiment of the 2D-to-1D waveguide array; with FIG. 2B showing a side profile view of the 2D-to-1D waveguide array.
Figure 2B:
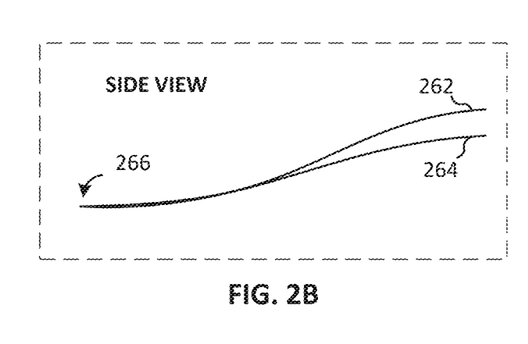

FIGS. 2A-B are views of aspects of the coupler 110A waveguide of FIG. 1A, with FIG. 2A showing an embodiment of a 2D-to-1D waveguide array. In FIG. 2A, a portion of the coupler is illustrated to show the internal structure of the waveguide array, showing the physical structure converting the 2D structure 210, 220 to the 1D array structure 230. In the various embodiments, including in FIG. 2A, surface indicators 250a-e (e.g., fiducials) may be included to provide points of reference for imaging systems such as machine vision systems to place and align the various components such as coupler 110A. For example, the surface indicators 250a-e may be used for placing and aligning the coupler waveguide 110A onto the PIC substrate. In FIG. 2A, some surface indicators are omitted to avoid obscuring the diagram. In some embodiments, there may be more or fewer surface indicators 250a-e as desired to aid the imaging systems. FIG. 2B shows a side profile view of the two-dimensional array 262, 264 to a one-dimensional array 266.

Figure 3A:
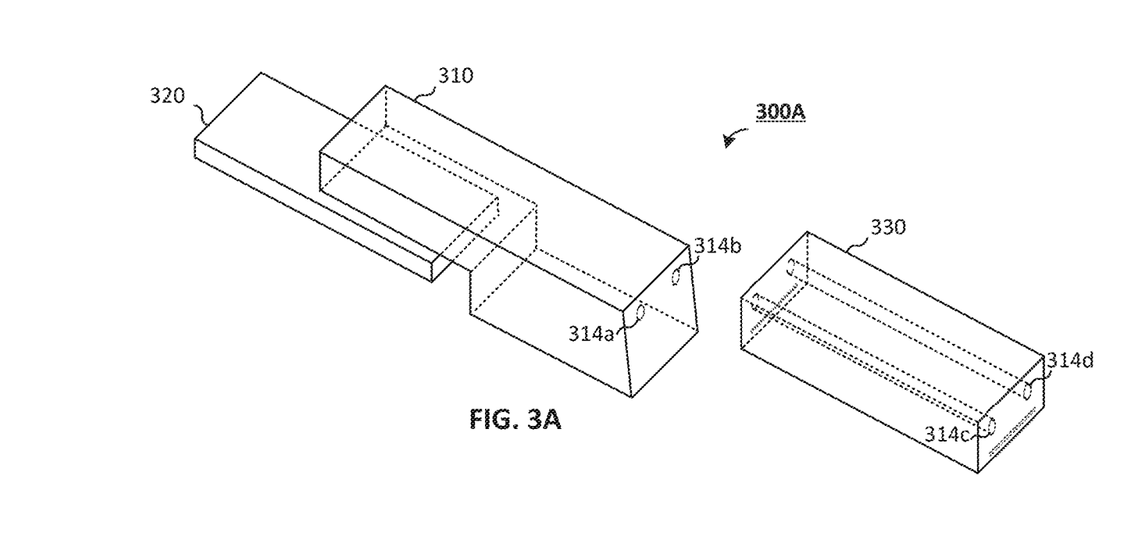

FIG. 3A illustrates another exemplary coupler connector configuration 300A using a single row fiber array structure including a PIC substrate 320, a coupler waveguide 310, and a connector module 330. Where features are similar to FIG. 1A, some of the description may be omitted for brevity. The coupler 310 may include pin holes 314a-b for inserting alignment pins to couple the connector module 330 to the coupler 310. Corresponding pin holes 314c-d on the connector module 330 enable insertion of the pins into the connector module 330. While the pins holes 314c-d are shown spanning the entire length of the connector module 330, in some embodiments the pin holes 314a-b/c-d in the coupler 310 or the connector module 330 may have varying depths to suit design requirements.

Figure 3B:
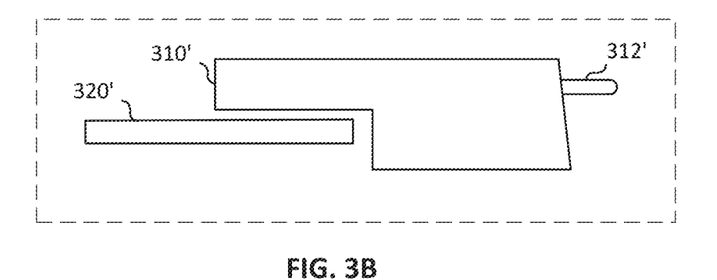
Figure 3C:
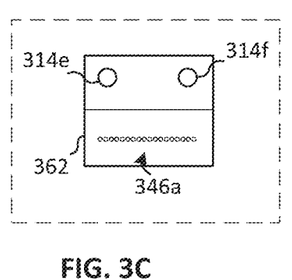
FIG. 3C showing a rear face profile view of the coupler waveguide.
Figure 3D:
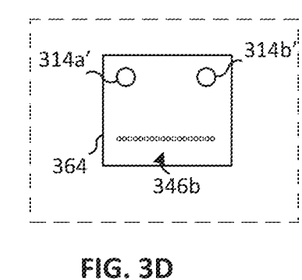
FIG. 3D showing a front face profile view of the coupler waveguide.

FIG. 3B illustrates a side view of the PIC substrate 320' and coupler waveguide 310' with an attached alignment pin 312'. FIGS. 3C-D show the front and rear face profiles of the coupler waveguide. FIG. 3C shows the rear face 362 (couples to PIC substrate) showing the location of pin holes 314e-f and the location of the waveguides 346a facing the PIC substrate. On this rear face 362, the waveguides 346a are arranged in a single row. FIG. 3D shows the front face 364 (couples to connector module) showing the location of pin holes 314a'-b' and the location of the waveguides 346b facing the connector module. On this front face 364, the waveguides 346a match the orientation of the rear face, oriented in a single row.

Figure 4A:
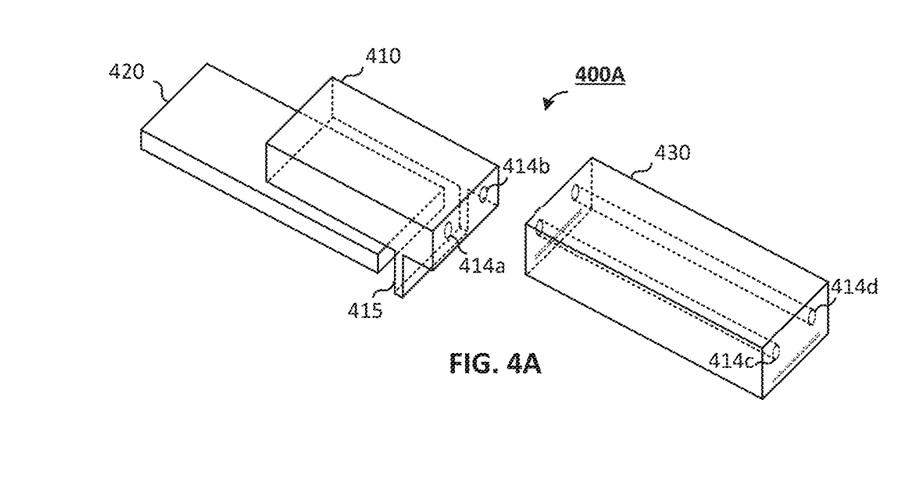

FIG. 4A illustrates another exemplary coupler connector configuration 400A that may be used with a lens plate 415 (or lens structure or lens array) including a PIC substrate 420, a coupler waveguide 410, and a connector module 430. Where features are similar to FIG. 1A, some of the description may be omitted for brevity. The coupler 410 may include pin holes 414a-b for inserting alignment pins to couple the connector module 430 to the coupler 410. Corresponding pin holes 414c-d on the connector module 430 enable insertion of the pins into the connector module 430. While the pins holes 414c-d are shown spanning the entire length of the connector module 430, in some embodiments the pin holes 414a-b/c-d in the coupler 410 or the connector module 430 may have varying depths to suit design requirements.

Figure 4B:
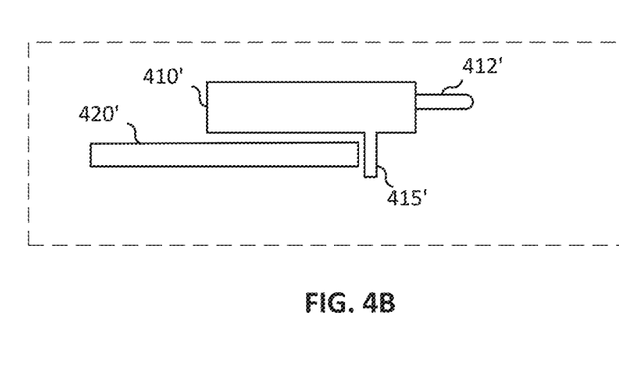
Figure 4C:
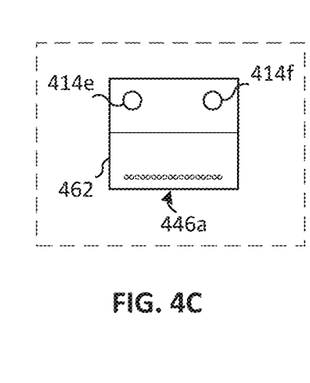
FIG. 4C showing a rear face profile view of the coupler waveguide.
Figure 4D:
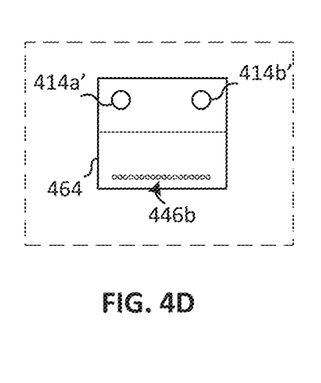
FIG. 4D showing a front face profile view of the coupler waveguide.

FIG. 4B illustrates a side view of the PIC substrate 420' and coupler waveguide 410' with an attached alignment pin 412'. As shown in FIG. 4B, the coupler may include a lens plate 415'. In some embodiments where the lens plate 415' and coupler 410' are separate pieces, the lens plate 415' may be glued (e.g., using epoxy) or otherwise mated to the coupler 410' and the PIC substrate 420'. FIGS. 4C-D show the front and rear face profiles of the coupler waveguide. FIG. 4C shows the rear face 462 (couples to PIC substrate) showing the location of pin holes 414e-f and the location of the waveguides 446a facing the PIC substrate. On this rear face 462, the waveguides 446a are arranged in a single row. FIG. 4D shows the front face 464 (couples to connector module) showing the location of pin holes 414a'-b' and the location of the waveguides 446b facing the connector module. On this front face 464, the waveguides 446b match the orientation of the rear face, oriented in a single row.

Figure 5A:
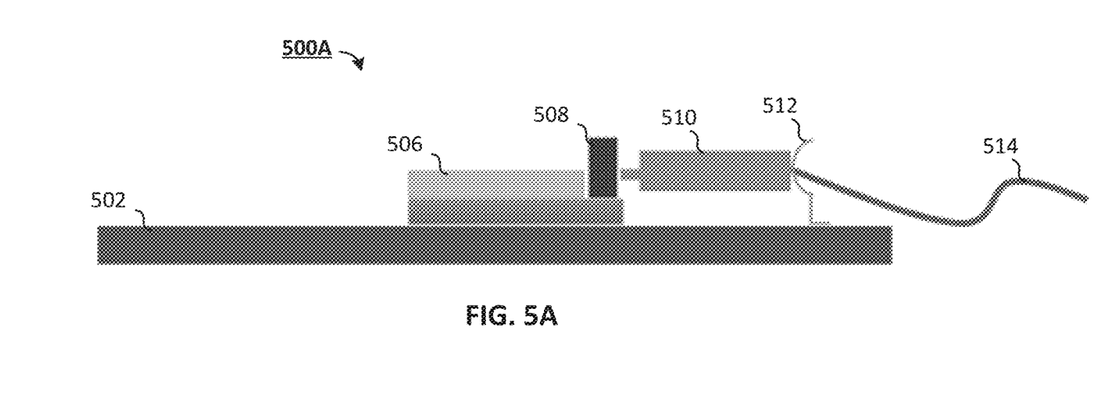
FIGS. 5A-B are views of another exemplary coupler connector configuration using a lens structure coupling the connector ferrule to the PIC, with a side view (FIG. 5A) and overhead view (FIG. 5B).
Figure 5B:
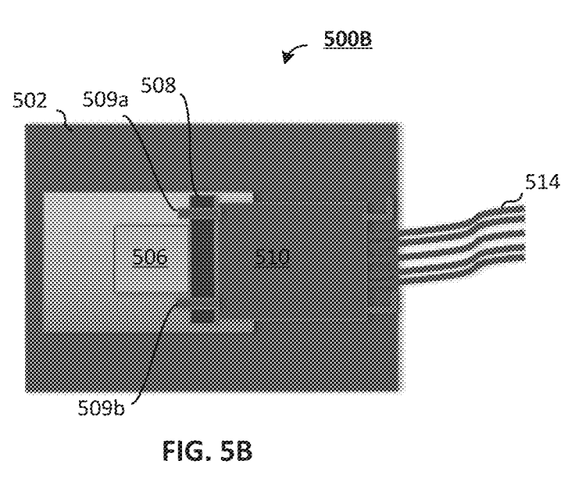

FIGS. 5A-B are views of another exemplary coupler connector configuration 500A using a lens plate 508 coupling a ferrule 510 to the PIC 506, with a side view (FIG. 5A) and overhead view (FIG. 5B). The PIC 506 may be mounted on a host printed circuit board (PCB) 502. In this example, the signals from the optical fibers 514 are transmitted to the PIC 506 using a lens plate 508. A biasing force may be provided using a metal plate spring 512 that forwardly engages the ferrule 510 to the lens plate 508. The biasing force ensures the optical fibers 514 are securely coupled to the lens plate 508. The ferrule 510 may include alignment pins (housed in pin holes) that extend into the lens plate 508, with the alignment pins for aligning the two components 508, 510. In the overhead view 500B of FIG. 5B, latches 509a-b are shown to securely mate the connector module 510 to the lens plate 508.

Figure 6:
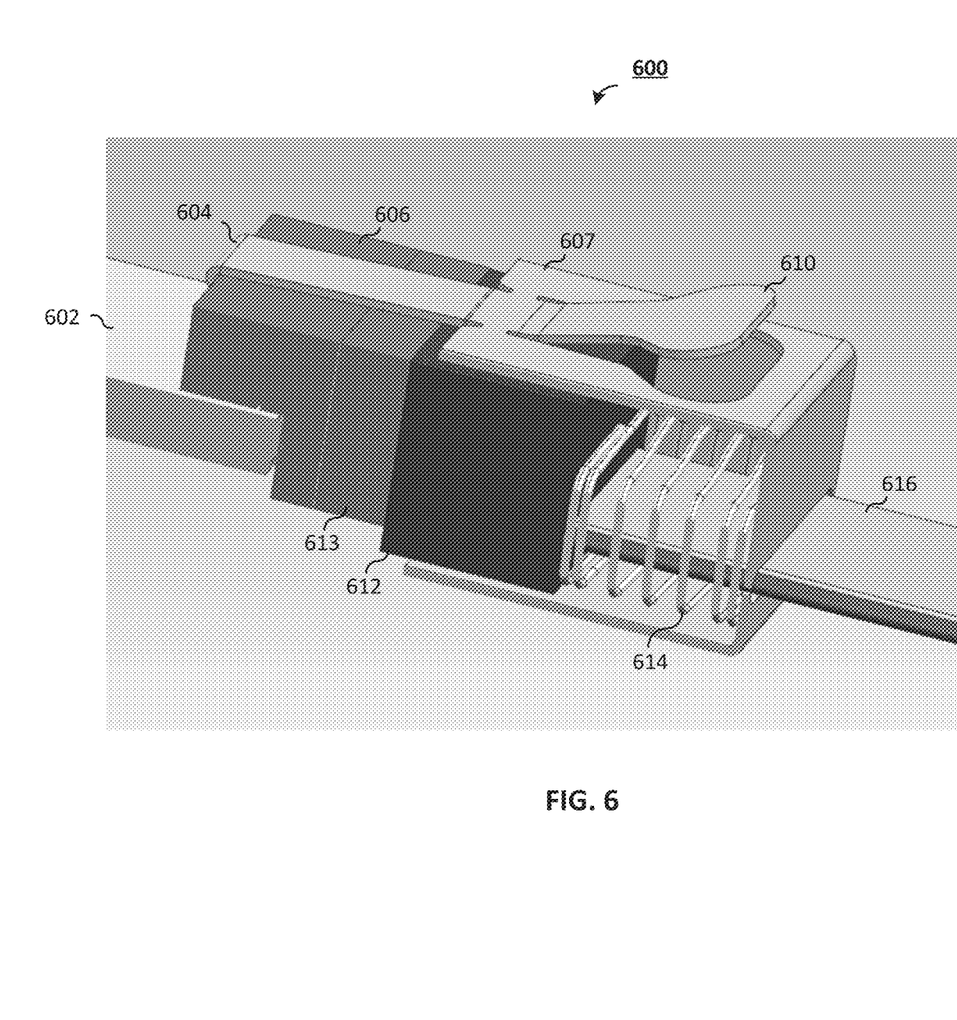
FIG. 6 illustrates another exemplary coupler connector configuration showing a connector module design with a low-profile latching mechanism.

FIG. 6 illustrates another exemplary coupler connector configuration 600 showing a connector module 607 design with a low-profile latching mechanism 604, 610; the see-through view shows the spring 614 housed inside the connector module 607. The configuration 600 may be based on the coupler embodiments of FIG. 1, FIG. 3, or FIG. 4. In the configuration shown in FIG. 6, the embodiment may include a ferrule 612 coupled to a lens plate 613. In some embodiments, the ferrule 612 and lens plate 613 may be a unitary body made from a polymer or glass material. In other embodiments, an index matching film may be used in place of the lens plate 613. The ferrule 612 is connected to the coupler 606, which is connected to the PIC substrate 602.

The connector module 607 includes the latch 604 or latching hook that grasps the coupler 606 (the square body of which doubles as a latch block). A release tab 610 is positioned opposite the latch hook 604; when the release tab 610 is depressed, the latch hook 604 is raised allowing the connector module 607 to detach from the coupler 606. As illustrated, the latch hook 604 and latch release tab 610 are thin to minimize the profile of the connector module 607. In some embodiments, the latch 604 may be designed for use only during assembly. In some embodiments, the latch 604 may be soldered or glued (e.g., using epoxy) to the coupler 606. The connector module 607 may include an internal spring 614 as a biasing element to forwardly bias the optical fibers of the ribbon 616 against the lens plate 613 (or coupler 606 when the configuration does not include the lens plate 613). The connector module 607 may include alignment pins (not shown) housed in pin holes, with the alignment pins extending into pin holes in the lens plate 613 and coupler 606.

In some embodiments, the components may be selected for assembly and manufacturing in a reflow soldering environment with multi-cycle heat processes (e.g., with temperatures of 260 centigrade or higher).

Figure 7A:
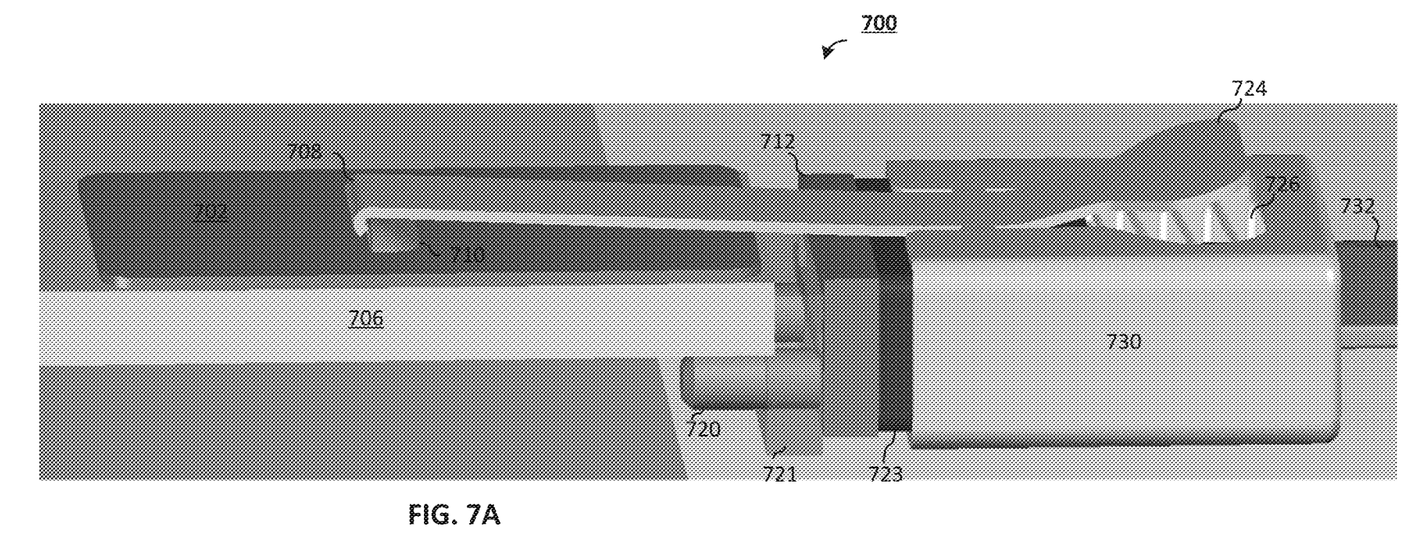
FIG. 7A illustrates another exemplary coupler connector configuration showing a connector module design with a low-profile latching mechanism.

FIG. 7 illustrates another exemplary coupler connector configuration 700 showing a connector module 730 design with a low-profile latching mechanism 708, 724. The configuration 700 may be based on the coupler embodiments of FIG. 1, FIG. 3, or FIG. 4. In the configuration shown in FIG. 7, the embodiment may include a ferrule 723 coupled to a lens plate 712. In some embodiments, the ferrule 723 and lens plate 712 may be a unitary body made from a polymer or glass material. In other embodiments, an index matching film may be used in place of the lens plate 712. The ferrule 723 is connected to the coupler or lens plate 721 which is connected to the PIC substrate 706.

The connector module 730 includes the latch 708 or latching hook that grasps the latch block 710 of a plate 702 mated to the PIC substrate 706. A release tab 724 is positioned opposite the latch 708; when the release tab 724 is depressed, the latch hook 708 is raised allowing the connector module 730 to detach from the plate 702, and therefore detach from the PIC substrate 706. As illustrated, the latch hook 708 and latch release 724 are thin to minimize the profile of the connector module 730. The connector module 730 may include an internal spring 726 as a biasing element to forwardly bias the optical fibers of the ribbon 732 against the lens plate 712 (or coupler 721 when the configuration does not include the lens plate 712). The connector module 730 may include alignment pins 720 housed in pin holes, with the alignment pins extending into pin holes in the lens plate 712 and coupler 721.

Figure 7B:
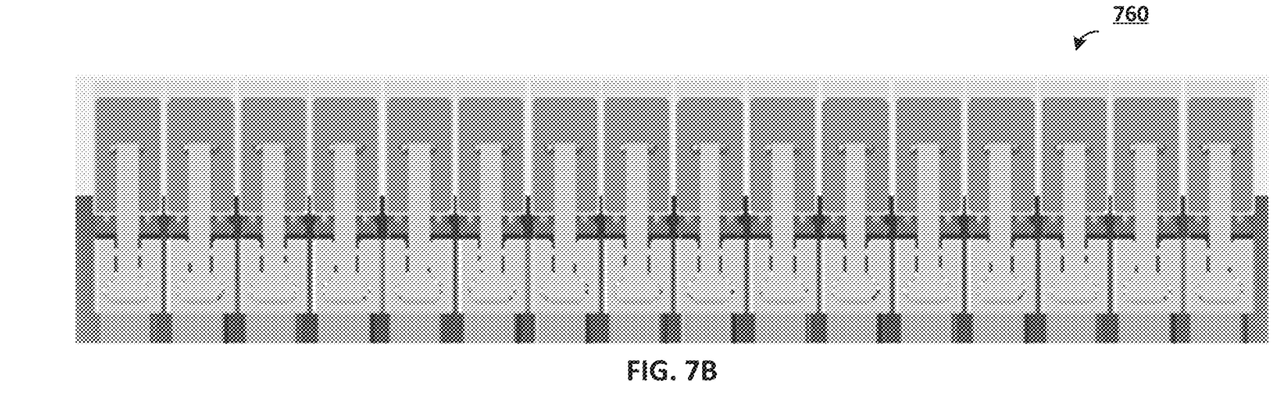
FIG. 7B illustrates an array of sixteen example coupler connectors of FIG. 7A.

FIG. 7B illustrates an array of sixteen example coupler connectors 700 of FIG. 7A. In the example of FIG. 7B, each ferrule may include sixteen optical fibers with the setup 760 accommodating 256 optical fibers. In some embodiments, the setup 760 may be contained within a length of less than 80 millimeters.

Figure 8:
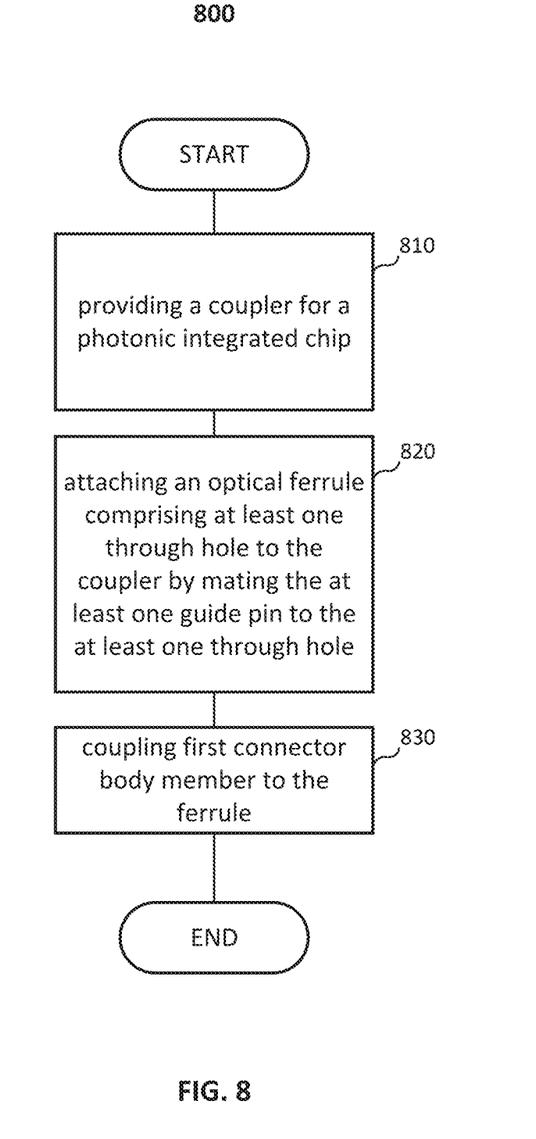
FIG. 8 is a flow chart illustrating an exemplary method for assembling a connector module.

FIG. 8 is a flow chart illustrating an exemplary method 800 for assembling a configuration including an edge connector module. For example, the method may illustrate the steps for assembling the configuration 600 of FIG. 6 or configuration 700 of FIG. 7.

At step 810, the method may include providing a coupler for a PIC. For example, the coupler may be the couplers in the embodiments shown in FIGS. 1, 3, 4, or FIGS. 6, 7. At step 820, the method may include attaching an optical ferrule including at least one through hole to the coupler by mating the at least one guide pin to the at least one through hole. At step 830, the method may include coupling a first connector body member to the ferrule.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. An optical interconnect module comprising:
a coupler for interfacing to a photonic integrated chip, the coupler comprising at least one guide pin; and
an optical ferrule configured for being removably attached to the coupler, the optical ferrule comprising at least one through hole for receiving the at least one guide pin from the coupler, wherein the coupler further comprises a waveguide structure and a lens plate to couple optical fiber signals of optical fibers, wherein the waveguide structure is configured to direct multiple rows of optical fiber signals on to a single row of optical fiber signals through optical waveguide coupling, and the lens plate extends downwardly from a bottom surface of the coupler and is configured to connect the optical fibers and the photonic integrated chip.

2. The optical interconnect module of claim 1, wherein the optical ferrule further comprises a latching mechanism configured to grasp the coupler at a latching block for secure attachment.

3. The optical interconnect module of claim 1, wherein the optical ferrule further comprises a tensioning member configured to provide forward bias of a ribbon cable to the coupler.

4. The optical interconnect module of claim 1, wherein the at least one guide pin comprises at least two guide pins oriented on a first plane above a second plane that defines the orientation of the waveguides.

5. The optical interconnect module of claim 1, wherein the coupler comprises a visual surface indicator for automated alignment and placement of the coupler within the optical interconnect module.

6. The optical interconnect module of claim 1, wherein the coupler comprises waveguides preserving polarization of the light beams.

7. The optical interconnect module of claim 1, wherein the photonic integrated chip comprises attachment points for connection to the coupler.

8. The optical interconnect module of claim 7, wherein the attachment points comprise at least one metallization point for solder joints, and the coupler comprises complementary points for soldering to the photonic integrated chip.

9. The optical interconnect module of claim 1, wherein the coupler further comprises metallization elements to enable hermetic sealing or electromagnetic interference control.

10. The optical interconnect module of claim 1, wherein the coupler is manufactured using a glass material.

11. The optical interconnect module of claim 1, wherein the coupler comprises a mating surface comprising fibers or lenses or optical waveguides mating to corresponding optical fibers or lenses from the optical ferrule.

12. The optical interconnect module of claim 1, wherein the coupler further comprises a photonic integrated chip-side facet for mating to corresponding waveguides, lenses, or other optical coupling means of the photonic integrated chip.

13. The optical interconnect module of claim 1, wherein the coupler further comprises optical fibers or waveguides, and the coupler further comprises means for matching photonic integrated chip-side optical waveguide mode fields to the coupler optical fibers or waveguides.

14. The optical interconnect module of claim 1, wherein the optical ferrule further comprises a plurality of fiber holes having fiber hole-to-fiber hole pitch between 100 micrometers to 250 micrometers, or fiber holes having outer diameters from 80 micrometers to 125 micrometers, or fiber holes having a total width of approximately 4 millimeters.

15. A method for assembling an optical interconnect module for coupling a photonic integrated chip to an optical ferrule, the method comprising:
providing a coupler for the photonic integrated chip, the coupler comprising at least one guide pin; and
attaching an optical ferrule comprising at least one through hole to the coupler by mating the at least one guide pin to the at least one through hole, the optical ferrule configured to be removably attached to the coupler, wherein the coupler further comprises a waveguide structure and a lens plate to couple optical fiber signals of optical fibers, wherein the waveguide structure is configured to direct multiple rows of optical fiber signals on to a single row of optical fiber signals, and the lens plate extends downwardly from a bottom surface of the coupler and is configured to connect the optical fibers and the photonic integrated chip.

16. The method of claim 15, wherein the optical ferrule comprises a latching hook and an internal spring to forwardly bias the optical fibers against the lens plate, wherein the coupler comprises a latch block, and attaching the optical ferrule comprises latching the optical ferrule to the latch block on the coupler.

17. The method of claim 15, wherein the coupler comprises a visual surface indicator, and attaching the coupler comprises aligning and placing the coupler on a photonic integrated chip using the visual surface indicator.

18. The method of claim 17, wherein aligning and placing comprise machine vision recognizing the visual surface indicator and aligning based on the visual surface indicator.

19. The method of claim 15, wherein attaching the coupler comprises reflow soldering the coupler to the photonic integrated chip.

20. The method of claim 15, wherein the optical ferrule further comprises a fiber ribbon and a tensioning member, and attaching the optical ferrule to the coupler tensions the fiber ribbon against a mating surface of the coupler.

21. The optical interconnect module of claim 1, wherein the optical ferrule further comprises a latching hook configured to grasp the coupler at a latching block for secure attachment, and an internal spring to forwardly bias the optical fibers against the lens plate.

* * * * *